Figure 1:
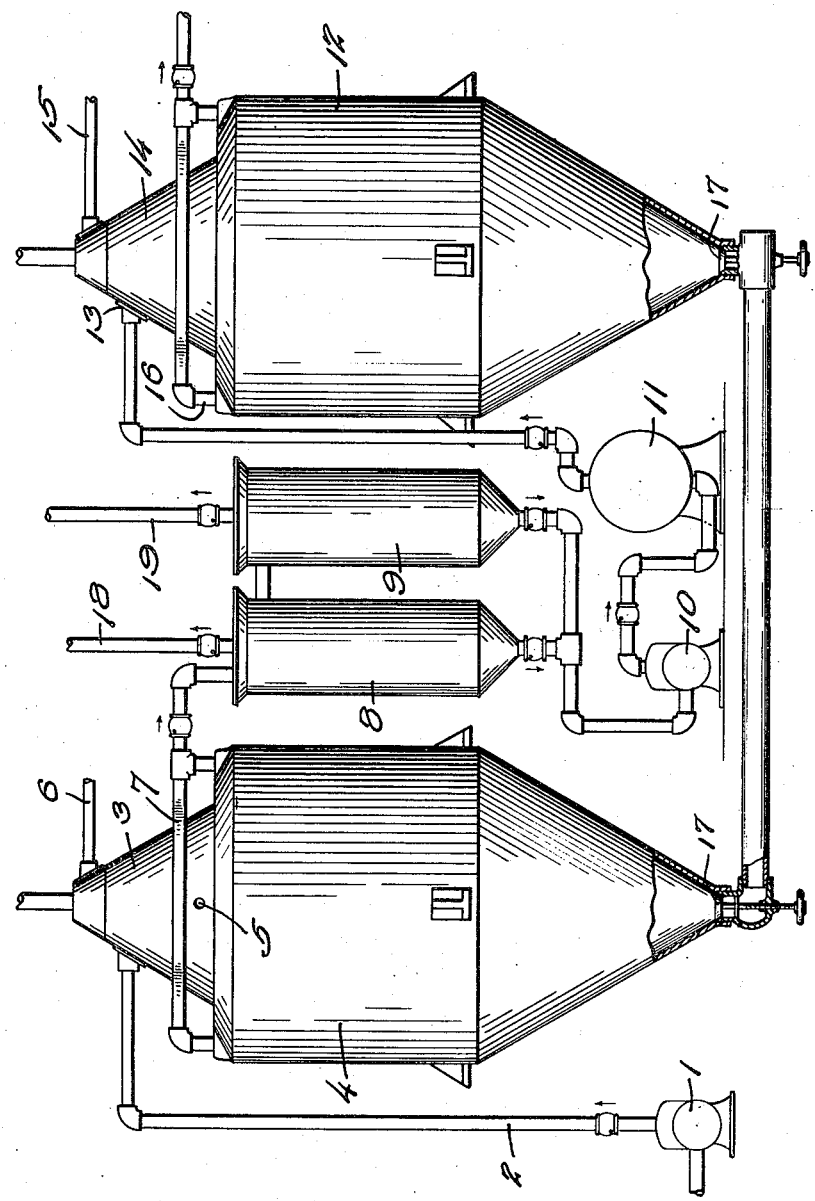

E. J. RUCKSTUHL.
PROCESS OF REFINING SACCHARINE JUICE.
APPLICATION FILED AUG. 21, 1913.

1,201,104.

Patented Oct. 10, 1916.
2 SHEETS—SHEET 1.

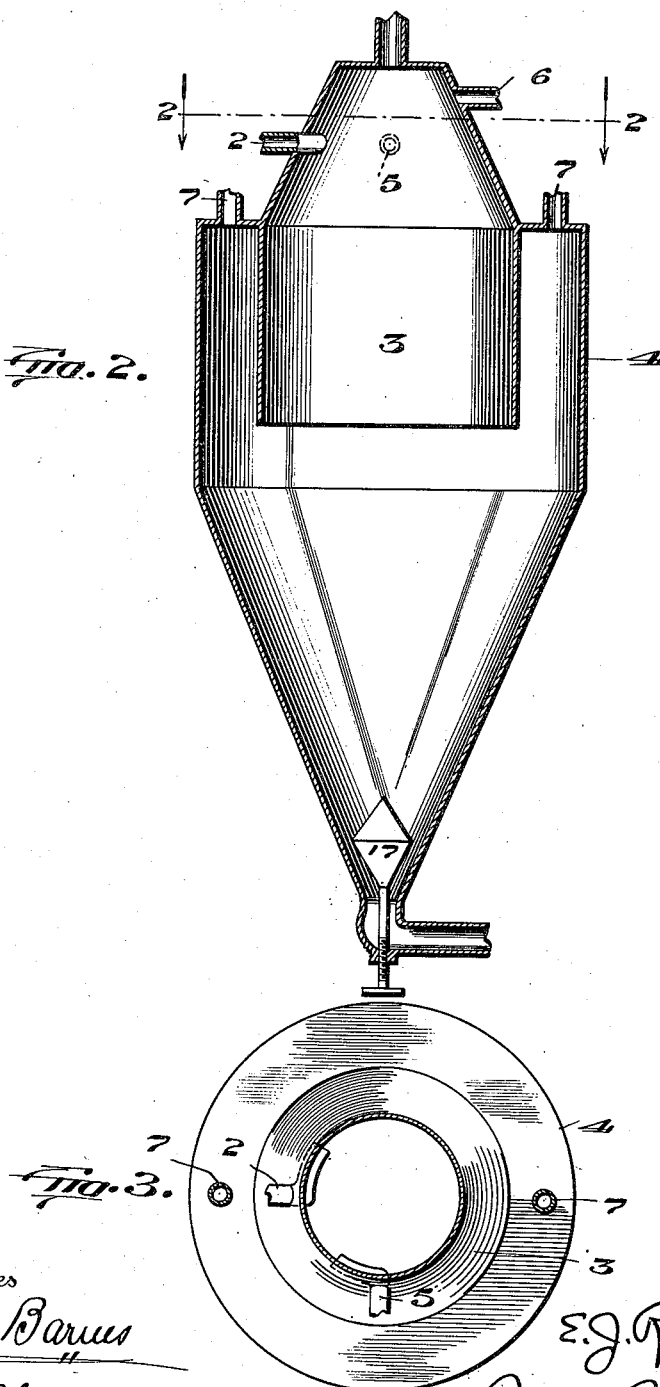

UNITED STATES PATENT OFFICE.

EDWARD J. RUCKSTUHL, OF LEVERT, LOUISIANA.

PROCESS OF REFINING SACCHARINE JUICE.

1,201,104.  Specification of Letters Patent.  Patented Oct. 10, 1916.

Application filed August 21, 1913. Serial No. 785,952.

*To all whom it may concern:*

Be it known that I, EDWARD J. RUCKSTUHL, citizen of the United States, residing at Levert, in the parish of St. Martin and State of Louisiana, have invented new and useful Improvements in Processes of Refining Saccharine Juice, of which the following is a specification.

My present invention pertains to the refining of sugar-cane juice; and it contemplates the provision of a process by the practice of which raw cane juice, as it comes from the mill or after it is subjected to the action of sulfurous acid fumes, can be expeditiously and inexpensively freed of dirt and other foreign substances, vegetable waxes and gums, cellulose and fiber, and the vegetable waxes and gums can be profitably recovered as by products of the process.

In the accompanying drawings which are hereby made a part hereof: Figure 1 is a diagrammatic view of the apparatus which is preferably, though not necessarily, employed in the practice of the process. Fig. 2 is a vertical section of one of the separators. Fig. 3 is a horizontal section taken through the collector of the separator in the plane indicated by the line 3—3 of Fig. 2, looking downwardly.

The apparatus illustrated will be fully understood from the following detailed description of the process.

In carrying out the process, raw cane juice as it comes from the crushing apparatus or after it is subjected to the action of sulfurous acid fumes is supplied to a pump 1 by which it is forced under pressure through a conduit 2 and past non-return means, so that it enters at a high velocity the collector 3 of a separator 4. Said collector 3 is preferably of conventional construction. Compressed air is also jetted into the collector 3 at the point 5 from a suitable source of supply (not shown), and the said compressed air jet gives rise to a mechanical agitation which causes the formation of a foam on the raw juice. The said foam leaves the separator 4 at 6, with wax, gum and fiber, and dirt-free juices leave the separator 4 at 7 and pass to a receiving tank 8 for the ordinary, well known treatment of milk of lime. From the tank 8 juices overflow to tank 9 which is provided for the neutralization of any excess of lime through the medium of carbonic acid or phosphoric acid. The juices supplied to pump 10 are conducted to a heater 11 in which the juices are heated to 200 degrees F., after which juices pass to the separator 12 and enter the same at the point 13 of the collector 14. Here the remaining fiber, air and light substance are removed at the point 15; the dirt-free juices leaving at the point 16 for the evaporating apparatus, while the heavy substance or substances leave at the points 17 of the two separators and pass to filter presses or the like (not shown).

18 and 19 are lime and air pipes designed for use in the thorough mixing of the juices.

While designed more particularly for the treatment of raw cane juices, I would have it understood that my improved process is adapted to be used to advantage in the treatment of raw juices from sugar beets.

Important features of my invention are the elimination of vegetable waxes, cellulose and fiber, and the recovery of the vegetable waxes and gums which takes place while the raw juices are maintained in a state of violent mechanical agitation.

It is manifest that subsequently to the passage of the foam containing wax, gum and fiber from the separator 4 at the point 6, wax and gum may be separated from the other substances and each other and recovered in the ordinary well known manner or any other suitable manner.

It will be appreciated that the liming and heating of the juices as the same come from the crushing apparatus cause the lime to combine with the vegetable waxes and cellulose and form an emulsion which, after being heated, will require mechanical filtration to remove.

Sugar cane as delivered at the mill contains a considerable quantity of vegetable waxes in the form of gum-like deposits on the rind and joints of the stalks. It will be readily appreciated that after removing about 80% of the wax before heating, defecation will be rendered comparatively easy, and the juice product will be improved in addition to the recovery of the wax as a by-product.

Having described my invention, what I claim and desire to secure by Letters-Patent, is:

The herein described process, which consists in supplying saccharine juice at a high velocity to the upper portion of a closed vessel, jetting compressed air into the upper portion of the closed vessel and into the juice as the same enters the vessel at a high velocity, whereby foam is formed on the juice in the vessel, and conducting the said foam and the substances therein from the upper portion of the vessel.

In testimony whereof I have hereunto set my hand in presence of two subscribing witnesses.

EDWARD J. RUCKSTUHL.

Witnesses:
  HENRY P. OLIVIER,
  GEORGE J. OLIVIER.